Feb. 24, 1925.                                                    1,527,548
C. B. HALL
FILM FEEDING MECHANISM FOR MOTION PICTURE MACHINES
Filed Dec. 18, 1922
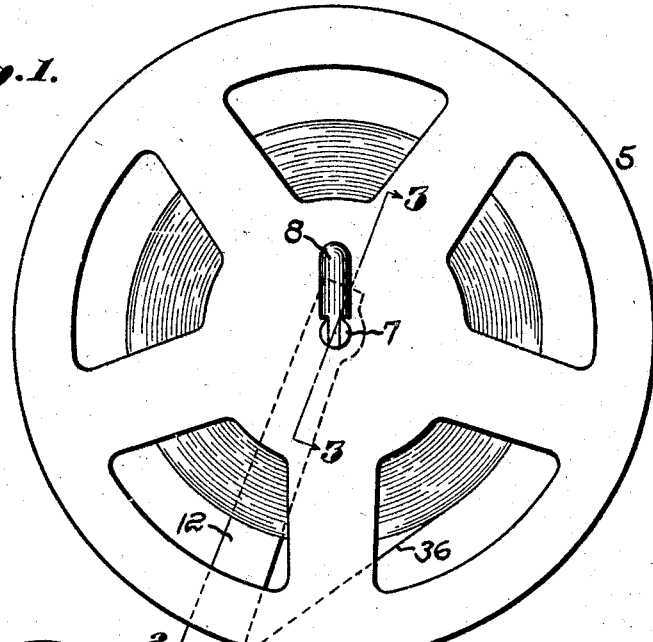
Fig.1.
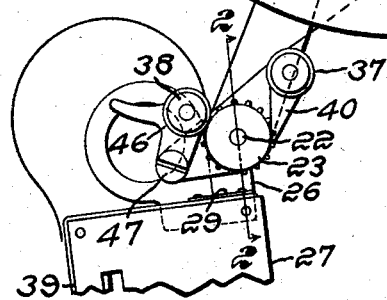
Fig.3.
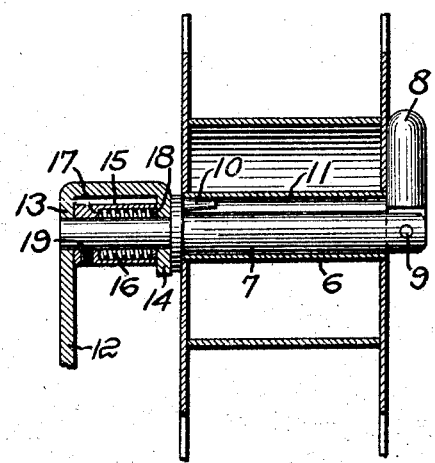
Fig.2.
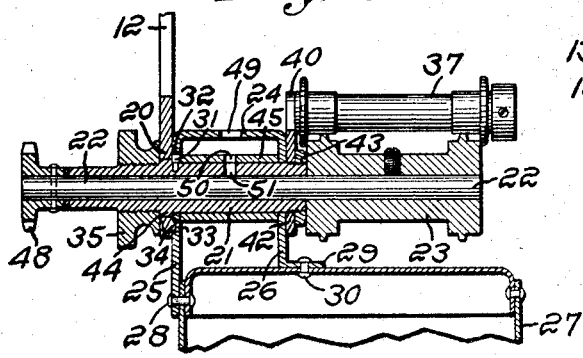
Inventor:
Clarence B. Hall,
by Emery, Booth, Janney & Varney
Attys.

Patented Feb. 24, 1925.

1,527,548

UNITED STATES PATENT OFFICE.

CLARENCE B. HALL, OF WINTHROP, MASSACHUSETTS, ASSIGNOR TO THE HALL PROJECTOR COMPANY, INC., OF EAST BOSTON, MASSACHUSETTS, A CORPORATION OF MASSACHUSETTS.

FILM-FEEDING MECHANISM FOR MOTION-PICTURE MACHINES.

Application filed December 18, 1922. Serial No. 607,491.

*To all whom it may concern:*

Be it known that I, CLARENCE B. HALL, a citizen of the United States, and a resident of Winthrop, in the county of Suffolk and State of Massachusetts, have invented an Improvement in Film-Feeding Mechanisms for Motion-Picture Machines, of which the following description, in connection with the accompanying drawings, is a specification, like characters on the drawings representing like parts.

This invention aims to provide a novel and improved film feeding mechanism for motion picture machines. The invention will be best understood by reference to the following description, when taken in connection with the accompanying drawings of one specific embodiment thereof, while its scope will be more particularly pointed out in the appended claims.

In the drawings:

Fig. 1 is a side elevation of a portion of a motion picture projector having a film feeding mechanism exemplifying the invention;

Fig. 2 is a sectional view on an enlarged scale on line 2—2 of Fig. 1; and

Fig. 3 is a sectional view on an enlarged scale on line 3—3 of Fig. 1.

Referring to the drawings, and to the film feeding mechanism which is selected for exemplification, there is shown a film reel 5, herein comprising a sleeve 6 (see Fig. 3), which receives a reel spindle 7, provided with usual reel-retaining arm 8 pivoted at 9 on the spindle. Herein the spindle is coupled to and rotates with the reel, as by providing the spindle with a pin or key 10, which is received in a keyway 11 presented by the sleeve 6.

The spindle is supported by a reel-supporting arm 12, which presents two walls 13 and 14, affording bearings for the spindle. Herein, these walls are the sides of a U-shaped end formed on the arm by making the latter of sheet metal bent as shown in Fig. 3. This is a strong and inexpensive way of making a long bearing for the spindle, and in addition it has the advantage of presenting a convenient location for a frictional brake now to be described, which resists turning movement of the reel.

Still referring to Fig. 3, the frictional brake in the present example comprises a sleeve 15, encircling the spindle and interposed between the bearings, said sleeve being chambered to receive a helically coiled spring 16, which furnishes the thrust to resist turning movement of the reel. Herein, one end of the spring is seated against a shoulder 17 within the sleeve, and at its other end is seated against a washer 18, which is loosely received in the sleeve and upon the spindle. A set-screw 19, threaded into the sleeve and screwed against the spindle, prevents the latter from being withdrawn accidentally. The spring urges the sleeve in one direction against the wall 13, and the washer 18 in the opposite direction against the wall 14, thus furnishing the desired braking effect.

The reel-supporting arm is pivotally mounted to swing from a normal upstanding position to a depending position, when the reel is removed and the machine is out of use. The pivotal mounting for the arm will now be described, reference being had to Fig. 2. The lower end of the arm presents a bearing 20 which is mounted upon the pivotal support, herein presented by a bushing 21, this bushing affording a bearing for a shaft 22, to which is secured a film-feeding sprocket 23, whose axis is coincident with the axis about which the reel-supporting arm is adjusted.

The bushing is mounted in an appropriate support, herein a bracket 24, having two walls 25 and 26, which are supported by a column 27, herein a box-like structure made of sheet metal, to one side of which the wall 25 is secured by a rivet 28, while the wall 26 is provided with a lug 29, which rests on the top of the column and is secured by the rivet 30. Rotation of the bushing in the bracket herein is conveniently prevented by a key or pin 31 secured to the bushing and received in a keyway 32 presented by the wall 25.

The reel-supporting arm is normally retained in its predetermined normal position by interlocking engagement with the bracket, as by providing the wall 25 with a perforation 33, which normally receives a projection 34 conveniently formed on the arm by extruding the metal, as clearly shown in Fig. 2. This interlocking engagement is normally maintained by the use of a nut 35 threaded onto the bushing. By unscrewing this nut a sufficient distance to permit the locking projection to be backed out of the opening, the arm may be swung from its normal elevated position to a depending position.

A film 36 wound on the reel is led therefrom over a guide-roll 37, thence over the sprocket wheel 23, and thence over a second guide-roll 38, whence it passes to a light aperture 39 in the column 27. Between the roll 38 and the light aperature, the film presents a loop, the precise form of which is of great importance, as is also the length of the arc of contact of the film with the film-feeding sprocket. These factors are determined by the positioning of the guide-rolls 38 and 39, and this is conveniently accomplished by mounting these guide-rolls on a support 40, which is adjustable about the axis of the film feeding sprocket, as by perforating the support to present a bearing 42, which is conveniently pivoted on the bushing 21 (see Fig. 2). When the proper angular position of the support has been determined, it may be secured in place, as by a nut 43 threaded onto the bushing, and clamping the support against the adjacent wall 26 of the sprocket. When the nut is screwed in place, a shoulder 44 presented by the bushing adjacent the wall 25 resists axial movement of the bushing in an inward direction. A wall-spacing sleeve 45, interposed between the walls 25 and 26, maintains a proper spacing of said walls, and prevents them from being forced one toward the other. Herein, the guide-roll 38 is mounted on a support 40 by a spring-pressed guide-roll 46 (see Fig. 1), pivoted on a stud 47.

Rotation of the shaft 22 may be accomplished in any usual manner, as by a driving sprocket wheel 48 (see Fig. 2), secured to the shaft, and driven by a chain (not shown). Lubrication of the shaft bearing is conveniently accomplished by the provision of oil holes 49, 50 and 51 provided in the bracket, spacing sleeve and bushing, arranged in alignment with one another, as shown in Fig. 2.

Having thus described one embodiment of the invention, but without limiting myself thereto, what I claim and desire by Letters Patent to secure is:

1. In a film feeding mechanism for motion picture machines, the combination of a reel for the film, a rotative reel spindle secured to and rotating with said reel, a reel supporting arm presenting two bearings for said spindle, a sleeve encircling and secured to said spindle and received between said bearings, a spring encircled by said sleeve and presenting a frictional resistance to rotation of said spindle in said bearings, a bushing presenting a pivotal support for said arm, a bracket having two walls presenting apertures in which said bushing is received, one of said walls presenting a keyway, a key received in said keyway and secured to said bushing, a wall spacing sleeve encircling said bushing and interposed between said walls, one of said walls presenting an opening and said arm presenting a locking projection normally received in said opening, a nut threaded onto said bushing and normally clamping said arm against the adjacent wall and retaining said locking projection in said opening, a shaft received in said bushing, a film-feeding sprocket secured to said shaft, two film guide rolls over which the film passes to and from said sprocket, a guide-roll support pivoted on said bushing to turn about the axis of said sprocket, a guide-roll support clamping-nut threaded onto said bushing, and a guide-roll carrier pivoted on said support.

2. In a film feeding mechanism for motion picture machines, the combination of a reel supporting arm, a bushing presenting a pivotal support for said arm, a bracket having two walls presenting apertures in which said bushing is received, one of said walls presenting a keyway, a key received in said keyway and secured to said bushing, a wall, spacing sleeve encircling said bushing and interposed between said walls, one of said walls presenting an opening and said arm presenting a locking projection normally received in said opening, a nut threaded onto said bushing and normally clamping said arm against the adjacent wall and retaining said projection in said opening, a shaft received in said bushing, a film-feeding sprocket secured to said shaft, two film guide rolls over which the film passes to and from said sprocket, a guide-roll support pivoted on said bushing to turn about the axis of said sprocket, a guide-roll support clamping nut threaded onto said bushing, and a guide-roll carrier pivoted on said support.

3. In a film feeding mechanism for motion picture machines, the combination of a reel, a reel supporting arm, a bushing presenting a pivotal support for said arm, a bracket having two walls presenting apertures in which said bushing is received, a shaft received in said bushing, and a film feeding sprocket secured to said shaft.

4. In a film feeding mechanism for motion picture machines, the combination of a reel, a reel supporting arm, a bushing presenting a pivotal support for said arm, a mounting having two walls presenting apertures in which said bushing is received, a wall-spacing sleeve encircling said bushing and interposed between said walls, a shaft received in said bushing, and a film feeding sprocket secured to said shaft.

5. In a film feeding mechanism for motion picture machines, the combination of a reel, a reel-supporting arm, a bushing presenting a pivotal support for said arm, means to lock said arm to said bushing, a mounting in which said bushing is received, means to lock said bushing to said bracket, a shaft received in said bushing, and a film feeding sprocket secured to said shaft.

6. In a film feeding mechanism for motion picture machines, the combination of a reel, a reel-supporting arm, a bushing presenting a pivotal support for said arm, a mounting in which said bushing is received, means to predetermine the normal angular position of said arm with respect to said mounting, means normally to secure said arm in such position, a shaft received in said bushing, and a film feeding sprocket secured to said shaft.

7. In a film feeding mechanism for motion picture machines, the combination of a reel, a reel-supporting arm, a bushing presenting a pivotal support for said arm, a mounting in which said bushing is received, means to predetermine the normal angular position of said arm with respect to said mounting, a nut threaded onto said bushing normally to secure said arm in such position, a shaft received in said bushing, and a film feeding sprocket secured to said shaft.

8. In a film feeding mechanism for motion picture machines, the combination of a reel, a reel-supporting arm, a bushing presenting a pivotal support for said arm, a mounting in which said bushing is received, interengaging means to predetermine the normal angular position of said arm with respect to said mounting, means normally to hold the last-mentioned means in interengagement, a shaft received in said bushing, and a film feeding sprocket secured to said shaft.

9. In a film feeding mechanism for motion picture machines, the combination of a reel, a reel-supporting arm, a bushing presenting a pivotal support for said arm, a mounting in which said bushing is received, interengaging means to predetermine the normal angular position of said arm with respect to said mounting, means disposed about said bushing normally to hold the last-mentioned means in interengagement, a shaft received in said bushing, and a film feeding sprocket secured to said shaft.

10. In a film feeding mechanism for motion picture machines, the combination of a reel, a reel-supporting arm, a bushing presenting a pivotal support for said arm, a mounting in which said bushing is received, interengaging means to predetermine the normal angular position of said arm with respect to said mounting, means to move the last-mentioned means into interengagement, a shaft received in said bushing, and a film feeding sprocket secured to said shaft.

11. In a film feeding mechanism for motion picture machines, the combination of a film reel, a rotative reel spindle secured to said reel, a reel-supporting arm presenting a U-shaped portion having walls affording bearings for said spindle, a spring encircling said spindle between said walls, a sleeve encircling said spring between said walls and presenting a shoulder affording an abutment for one end of said spring, a washer encircling said spindle and affording an abutment for the other end of said spring, and a fastening element which secures said sleeve to said spindle.

12. In a film feeding mechanism for motion picture machines, the combination of a film reel, a reel spindle, a reel-supporting arm presenting a U-shaped portion having walls in which said spindle is received, and a support on which one of said walls is mounted, the other wall terminating short of said support.

13. In a film feeding mechanism for motion picture machines, the combination of a film reel, a reel spindle secured to said reel, a reel-supporting arm presenting a U-shaped portion having a wall extending lengthwise of said spindle and two walls extending transversely of said spindle and affording bearings for said spindle, and a support on which one of said transverse walls is mounted, the other transverse wall being supported only by said lengthwise wall.

14. In a film feeding mechanism for motion picture machines, the combination of a film driven reel, a rotative reel driven spindle, a reel-supporting arm having spaced walls presenting bearings in which said spindle turns under the influence of said film driven reel and spindle, and brake means interposed between said walls presenting a frictional resistance to rotation of said spindle and unwinding of the film from said reel.

15. In a film feeding mechanism for motion picture machines, the combination of a film reel, a rotative reel spindle, a reel-supporting arm having spaced walls presenting bearings for said spindle, and a reel brake comprising a spring interposed between said walls and exerting an endwise pressure against one of them.

16. In a film feeding mechanism for motion picture machines, the combination of a film reel, a rotative reel spindle, a reel-supporting arm having spaced walls presenting bearings for said spindle, and a reel brake comprising a spring interposed between said walls and exerting an endwise pressure against both of them.

17. In a film feeding mechanism for motion picture machines, the combination of a film reel, a rotative reel spindle, a reel-supporting arm having spaced walls presenting bearings for said spindle, and a reel brake comprising a spring interposed between said walls, and a sleeve encircling said spring and urged thereby endwise against one of said walls.

18. In a film feeding mechanism for motion picture machines, the combination of a film reel, a rotative reel spindle, a reel-supporting arm having spaced walls presenting bearings for said spindle, and a reel brake comprising a spring interposed between said walls, a sleeve encircling said spring and urged thereby endwise against one of said walls, and a friction washer urged by the other end of said spring against the other wall.

19. In a film feeding mechanism for motion picture machines, the combination of a film feeding sprocket, a guide roll which guides the film with relation to said sprocket, and a guide roll mounting pivoted for adjustment about the axis of said sprocket.

20. In a film feeding mechanism for motion picture machines, the combination of a film feeding sprocket, a shaft which carries said sprocket, a bearing for said shaft, a guide roll which guides the film with relation to said sprocket, and a guide roll mounting pivoted on said bearing for adjustment about the axis of said sprocket.

In testimony whereof, I have signed my name to this specification.

CLARENCE B. HALL.